United States Patent Office

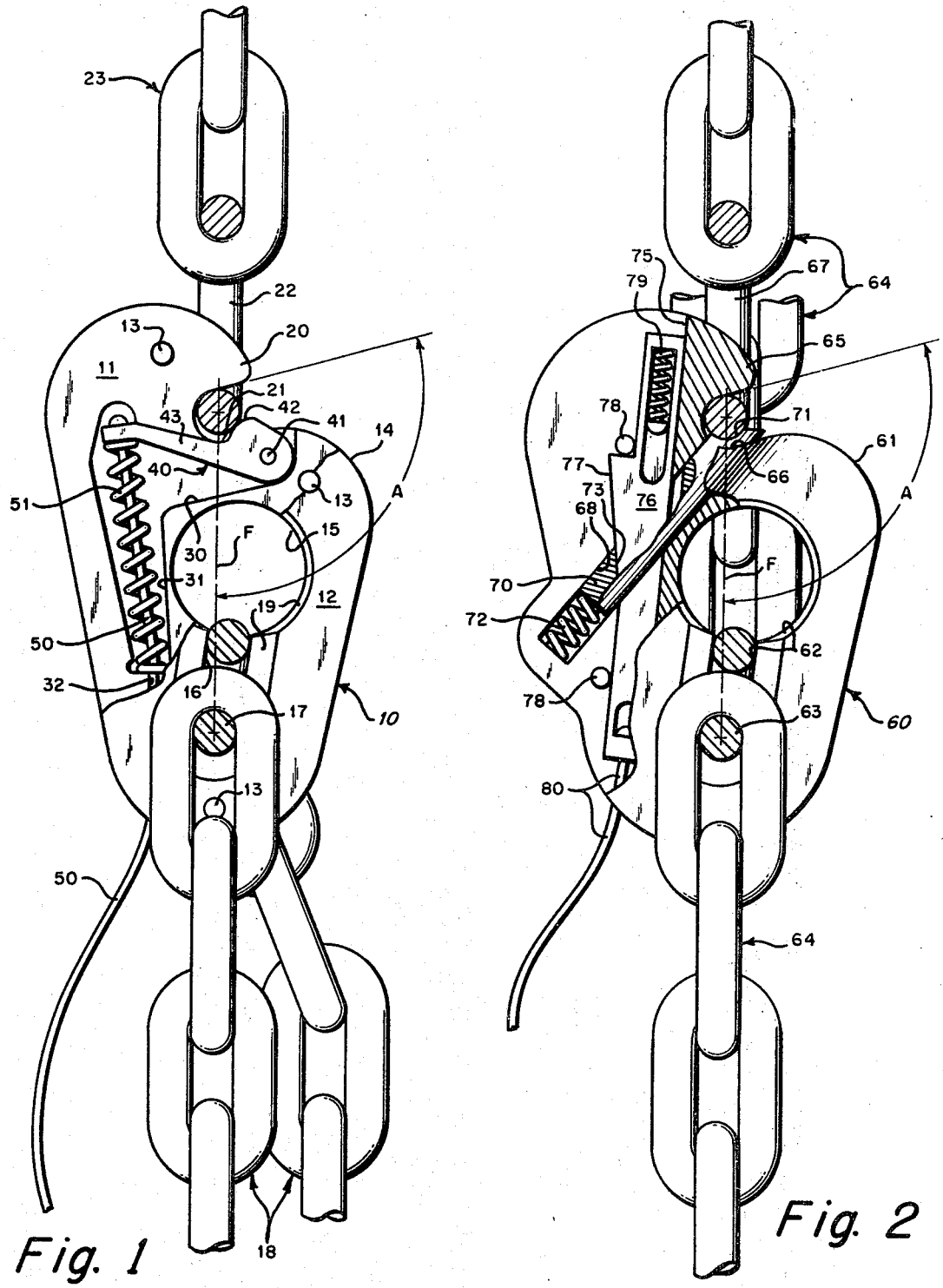

3,521,443
Patented July 21, 1970

3,521,443
HOOK FOR CARGO TIE-DOWN
Leo Dragonuk, Plymouth Meeting, Pa., assignor to the United States of America as represented by the Secretary of the Navy
Filed May 23, 1968, Ser. No. 731,530
Int. Cl. F16g 15/04
U.S. Cl. 59—86   13 Claims

ABSTRACT OF THE DISCLOSURE

A hook adapted for use with link chains for establishing quickly releasable tie-down arrangements including a body portion having a keyhole-shaped aperture adapted for locking engagement with a link chain and an obtusely inclined, protruding hook portion engageable with a chain link and having a spring-loaded keeper actuated by a lanyard to release a link retained by the hook portion.

STATEMENT OF GOVERNMENT INTEREST

The invention described herein may be manufactured and used by or for the Government of the United States without the payment of any royalties thereon or therefor.

The invention generally relates to hooks and link chains and, more particularly, to hook means for interconnecting link chains and being releasable under load.

Quick releasement of cargo tie-down arrangements in aircraft such as helicopters is particularly desirable when the aircraft is to be unloaded in hostile landing zones. Previous methods and apparatus for retrieving aircraft cargo tie-down involved time consuming operations of, first, releasing line tension means and, second, unhooking the tie-down apparatus. Other known releasable apparatus for securing cargo either requires complex manipulation for its operation or is costly to manufacture.

SUMMARY OF THE INVENTION

It is the general purpose of this invention to provide a simple, inexpensive, easily manufactured hook adapted for use with a link chain in forming cargo tie-down arrangements which are quickly releasable under load. Briefly, the general purpose is accomplished by providing a hook having a keyhole-shaped aperture formed in its body portion for releasably engaging a portion of a chain, an obtusely inclined hook for engaging a chain link and a spring-loaded, lanyard-operated keeper for retaining the link in captured engagement with the hook. A simple jerking of the lanyard effects an immediate release of the link from the hook portion and enables virtually instantaneous cargo releasement.

BRIEF DESCRIPTION OF THE DRAWING

FIG. 1 represents a view with portions broken away of a hook according to the invention; and FIG. 2 represents a view with portions broken away of a modified hook according to the invention.

DESCRIPTION OF THE PREFERRED EMBODIMENT

The hook 10 shown in FIG. 1 is formed from a juxtaposed pair of similarly shaped plates 11 and 12 made of a strong material such as heat treated steel and fixed together in abutting relation as by rivets 13. The hook 10 includes a body portion 14 having a circular aperture 15 formed therein of a size for threading a link chain therethrough and includes a slot 16 extending from one side of the aperture 15 for locking off a selected non-terminal link of a chain 18 which has been threaded through the aperture 15. In each plate 11 and 12, the lateral peripheries of the aperture 15 and the slot 16 are chamfered or beveled as at 19 to facilitate threading the chain 18 and locking-off the link 17. The hook 10 further includes a hook portion 20 protruding to confront the part of the body portion 14 lying adjacent the opposite side of the aperture 15 and forming therewith a link-receiving recess 21 for receiving a connecting chain link 22.

The confronting surfaces of the plates 11 and 12 have formed therein opposed recesses forming a latch-receiving cavity 30 extending into the body portion from the link-receiving recess 21. The opposed recessed portions of the plates 11 and 12 additionally extend transversely of the latch-receiving cavity 30 and generally parallel to the slot 16 and form a spring-receiving cavity 31. A bore 32 provides communication between the terminus of the cavity 31 and the exterior of the body portion 14.

A lever latch 40 is pivotally mounted in the latch-receiving cavity 30 on a pin 41 fixed to the body portion 14 adjacent the link-retaining recess 21. The latch 40 has a link-engaging shoulder 42 which is circularly curved relative to the pin 41 and which is movable into the recess 21 to retain the link 22 therein. A lever arm 43 extends from the shoulder 42 toward the spring-receiving cavity 31. A flexible lanyard cable 50 is connected to the lever arm 43 and is threaded through the bore 32 and through a coil spring 51 interposed between the bore adjacent terminus of the cavity 31 and the lever arm 43. The spring 51 normally urges the arm 43 to engage the hook-portion-adjacent periphery of the cavity 30 and thereby causes the link-engaging shoulder 42 to be moved into a link-retaining position for capturing the link 22 within the recess 21. Of course, the abutment of the lever arm 43 with the cavity 30 prevents the link 22 from releasement when the hook 10 is in use. The lanyard cable 50 is preferably made of flexible wire cable and may terminate in a loop or handle (not shown). Pulling the lanyard 50 to compress the spring 51 causes the shoulder 42 to be withdrawn from the link-receiving recess 21 thereby releasing the link 22.

The center of curvature of the link-receiving recess 21 is aligned with the center of curvature of the terminus of the slot 16 in the body portion 14 along line F which generally extends in the same direction as the resolved loading force component applied to the links 17 and 22 when the hook 10 is in use. The periphery of the hook portion confronting the body portion 14 is obtusely inclined relative to the line F at an obtuse angle A. A convenient size for the angle A is 105°. The size of the angle A is chosen to keep the force to which the latch 40 is subjected during loading to a minimum and yet permit quick releasement of the link 22 when the lanyard 50 is pulled to retract the shoulder 42 from the recess 21. The tension being applied to the link 22 causes the link 22 to slide off the hook portion 20 as soon as the shoulder 42 is withdrawn from the recess 21. It is desirable that the ratio of the length of the lever arm 43 to the length of the latch shoulder 42 relative to the pin 41 be selected to assure a large mechanical advantage, which is necessary to enable a slight jerk of the lanyard 50 to overcome frictional forces developed by the forced engagement of the link 22 with the shoulder 42 when the hook 10 is under load.

The modified hook 60 of FIG. 2 includes a solid body portion 61 having the keyhole-shaped aperture 62 for locking-off a selected link 63 of a chain 64 threaded therethrough. An obtusely inclined periphery of a projecting hook portion 65 forms a recess 66 for receiving a connecting link 67. A latch bore 68 extends from and obliquely of the recess 66 into the body portion 61 and slidingly receives a cylindrical plunger latch 70 having formed across its projecting end a transversely extending concave recess 71 shaped to conform to the abutting periphery of the link 67 retained thereby in the recess 66. The plunger 70 normally is urged to project into the recess by a coil spring 72 and has a transverse camming slot 73 formed therein generally in registry with a transversely extending key slot 75 formed in the body portion 61. A key 76 having an inclined camming surface 77 is inserted through the camming slot 73 of the plunger 70 and is retained by pins 78 for reciprocation along the key slot 75. A coil spring 79 is arranged in an aperture in the key 76 to urge the inclined surface 77 of the key 76 to be withdrawn from the slot 73 so that the plunger 70 can protrude into the recess 66 a sufficient distance to retain the link 67 therein. A flexible lanyard 80 is connected to the key 76 for enabling the plunger 70 to be withdrawn from the recess 66, releasing the link 67 to slide off the hook portion 65 under action of the loading forces applied to the hook 60.

As in the case of the hook 10, the center of curvature of the terminus of the link-receiving recess 66 lies along the line F extending parallel to the direction of the loading force applied to the hook 60 which line F extends through the center of curvature of the slotted terminus of the aperture 62. The angle of inclination A of the body portion-confronting periphery of the hook portion 65 is somewhat less than that for the hook 10 of FIG. 1, being about 100°, to reduce the load applied to the plunger 70 during use of the hook. The lanyard 80, further, is arranged relative to the body portion 61 so that pulling the lanyard 80 causes a moment to be applied to the hook 60 tending to withdraw the hook portion 65 from the link 67.

The hooks such as 10 and 60 are usable in tie-down arrangements which usually include a serially interconnected turnbuckle assembly, not shown. In the arrangement of FIG. 1, the hook 10 forms a linkage interconnecting the chain 18 connected to an anchored urnbuckle assembly (not shown) with the link 22 connected to the cargo (not shown) by the chain 23. In another useful arrangement indicated in FIG. 2 the chain 64 is threaded from an anchored turnbuckle assembly about a cargo-attached fitting, through the chain-locking aperture 62 of the hook 60 and through an anchor ring (not shown), the last link 67 of the chain 64 being hooked about the hook portion 65. The hook 60 position is adjusted to tighten the chain as much as is possible and the turn buckle (not shown) is tightened to affect cargo securement. A mere jerking of the lanyards 50 or 80 from any direction effects immediate releasement of the respective tie-down arrangement.

From the above, the invention clearly provides hooks for use in cargo tie-down arrangements which are quickly releasable under load and avoid the defects of previously known devices. The hooks of the invention may be inexpensively manufactured.

It should be understood, of course, that the foregoing disclosure relates only to preferred embodiments of the invention and that numerous modifications or alterations may be made without departing from the spirit and scope of the invention as set forth in the appended claims.

What is claimed is:

1. A hook for connection to a link chain having links of a predetermined width comprising:
   a body portion having formed therethrough an aperture having a minimum diameter greater than the width of he links for threading the chain therethrough and having formed therein a slot communicating with and extending from one side of said aperture having a length and width sized for locking-off and retaining a selected intermediate link of the chain; and
   a hook portion protruding from said body portion, confronting peripheries of said hook and body portions defining a link-receiving recess adjacent the other side of said aperture.

2. A hook for connection to a link chain comprising:
   a body portion having formed therethrough an aperture for threading the chain therethrough and having formed therein a slot communicating with and extending from one side of said aperture for retaining a selected link of the chain;
   a hook portion protruding from said body portion, confronting peripheries of said hook and body portions defining a link-receiving recess adjacent the other side of said aperture; and
   said confronting periphery of said hook portion extending obtusely of a loading force direction extending between said recess and said slot.

3. A hook according to claim 2 further comprising:
   link-retaining means carried by said hook and including a keeper member movable from a link-retaining position in said recess to a link-releasing position.

4. A hook according to claim 1 further comprising:
   link-retaining means carried by said hook and including a keeper member movable from a link-retaining position in said recess to a link-releasing position.

5. A hook for connection to a link chain comprising:
   a body portion having formed therethrough an aperture for threading the chain therethrough and having formed therein a slot communicating with and extending from one side of said aperture for retaining a selected link of the chain;
   a hook portion protruding from said body portion, confronting peripheries of said hook and body portions defining a link-receiving recess adjacent the other side of said aperture;
   link-retaining means carried by said hook including a keeper member movable from a link-retaining position in said recess to a link-releasing position;
   spring means arranged for positioning said keeper member in said link-retaining position;
   a lanyard cable connected to said link-retaining means for actuating movement of said keeper member to said link-releasing position.

6. A hook according to claim 5 wherein:
   said lanyard cable is arranged for actuation in a direction to apply a moment to said body portion about said slot tending to withdraw said hook portion from a link received in said recess.

7. A hook according to claim 5 wherein:
   said link retaining means includes mechanical force multiplying means responsive to actuation by said lanyard cable for moving said keeper member to said link-releasing position.

8. A hook according to claim 7 wherein:
   said body portion has formed therein a keeper member recess into which said keeper member is withdrawable to said link-releasing position; and
   said keeper member comprises a lever pivotally connected to said body portion, having an extended lever arm connected to said lanyard cable and having a link-retaining shoulder arranged adjacent the pivotal connection thereof to said body portion for movement between said link-retaining and link-releasing positions.

9. A hook according to claim 8 wherein:
   said body portion has formed therein said keeper member recess extending inwardly of said body portion adjacent said aperture from a terminus communicating with said link-receiving recess and confronting said hook portion and has formed therein a spring-receiving recess extending within said body portion transversely of said keeper member recess and terminating in a bore communicating with the exterior of said body portion;
   an end of said lanyard is threaded into said body portion through said bore and is connected to said extended end of said lever; and
   said spring means comprises a compressible coil spring interposed between said extended end of said lever member and the bore adjacent terminus of said spring-receiving recess and having said end of said lanyard coaxially threaded therethrough.

10. A hook according to claim 7 wherein
said body portion has extending thereinto a latch bore communicating with said link-receiving recess and has formed therein a camming member keyway extending transversely of and communicating with said latch bore; and said link retaining means further comprises:

a plunger latch slidingly received by said latch bore for movement between said link-retaining and link-releasing positions, the innermost end of said latch having formed therein a slot registerable with said camming member keyway;

spring means for positioning said latch in said link-retaining position;

an inclined camming member received for reciprocation in said camming member keyway and extending through said plunger latch slot for sliding engagement thereof, said lanyard being connected for moving said camming member to cause movement of said plunger from said link-retaining position to said link-releasing position; and spring means for resisting movement of said camming member in a direction to cause withdrawal of said plunger latch from said link-retaining position.

11. A connecting hook releasable under load comprising:

a body portion formed for connection to a mechanical linkage;

a hook portion protruding from said body portion and having a periphery confronting said body portion for forming a link-receiving recess, said confronting periphery extending obtusely of a loading force direction extending between said recess and a linkage connection point of said body portion; and link-retaining means carried by said hook and including a keeper member movable from a link-retaining position in said recess to a link-releasing position.

12. A hook according to claim 11 wherein said link-retaining means includes:

mechanical force multiplying means responsive to an actuator for moving said keeper member to said link releasing position; and a lanyard cable connected for actuating said force multiplying means.

13. A hook according to claim 1 further comprising: the portions of said body portion confronting said aperture and said slot being beveled.

References Cited

UNITED STATES PATENTS

| | | | |
|---|---|---|---|
| 1,195,019 | 8/1916 | Huber | 59—86 |
| 1,347,725 | 7/1920 | Weiss | 59—85 |
| 1,751,309 | 3/1930 | De Mone | 59—86 |
| 2,784,938 | 3/1957 | Huber | 24—116 |
| 3,027,615 | 4/1962 | Forney | 59—93 |
| 3,132,395 | 5/1964 | Luketa | 59—85 |

CHARLES W. LANHAM, Primary Examiner

G. P. CROSBY, Assistant Examiner

U.S. Cl. X.R.

24—116; 59—93